United States Patent [19]
Egli et al.

[11] Patent Number: 5,337,141
[45] Date of Patent: Aug. 9, 1994

[54] METHOD AND APPARATUS FOR DISTORTION FREE MEASUREMENTS

[75] Inventors: Werner H. Egli; Clair R. Tettemer, both of Minneapolis, Minn.

[73] Assignee: Honeywell Inc., Minneapolis, Minn.

[21] Appl. No.: 508,958

[22] Filed: Jun. 29, 1983

[51] Int. Cl.$^5$ .............................................. G01C 19/64
[52] U.S. Cl. ....................................... 356/350; 372/94; 348/607
[58] Field of Search ......................... 356/350; 372/94; 371/20, 23, 25, 28; 358/167; 364/724, 726

[56] References Cited

U.S. PATENT DOCUMENTS

| | | | |
|---|---|---|---|
| Re. 29,460 | 10/1977 | Mills | 364/724 |
| 4,074,264 | 2/1978 | Wilmot | 343/5 DP |
| 4,207,624 | 6/1980 | Dentino et al. | 367/135 |
| 4,273,970 | 6/1981 | Favin et al. | 324/57 N |
| 4,353,092 | 10/1982 | Bailey et al. | 358/160 |
| 4,445,779 | 5/1984 | Johnson | 356/350 |
| 4,504,146 | 3/1985 | Morgan | 356/350 |
| 4,513,286 | 4/1985 | Irabu | 343/5 CF |

FOREIGN PATENT DOCUMENTS 69365  1/1983  European Pat. Off. ............ 356/350

OTHER PUBLICATIONS

Li, W. H., "Some Design Considerations . . . Unknown Noise", Apr. 1980, pp. 1–75, NTIS AD-A123 99014; abst as.

Kuiak et al, "Influence of . . . Ring Laser", Oct. 1976, pp. 625–631, Zh Prikl. Spektrask., vol. 25, #4; abst as.

*Primary Examiner*—Nelson Moskowitz
*Attorney, Agent, or Firm*—Robert A. Pajak

[57] ABSTRACT

The present invention provides a method and apparatus for removing systematic distortion from measurements of an observable parameter. The method and apparatus of the present invention is particularly useful for removing systematic distortion in phase angle measurements of ring laser angular rate sensors.

6 Claims, 2 Drawing Sheets

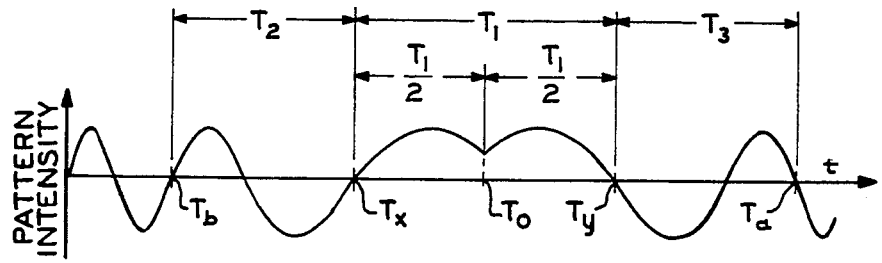
FIG. 8
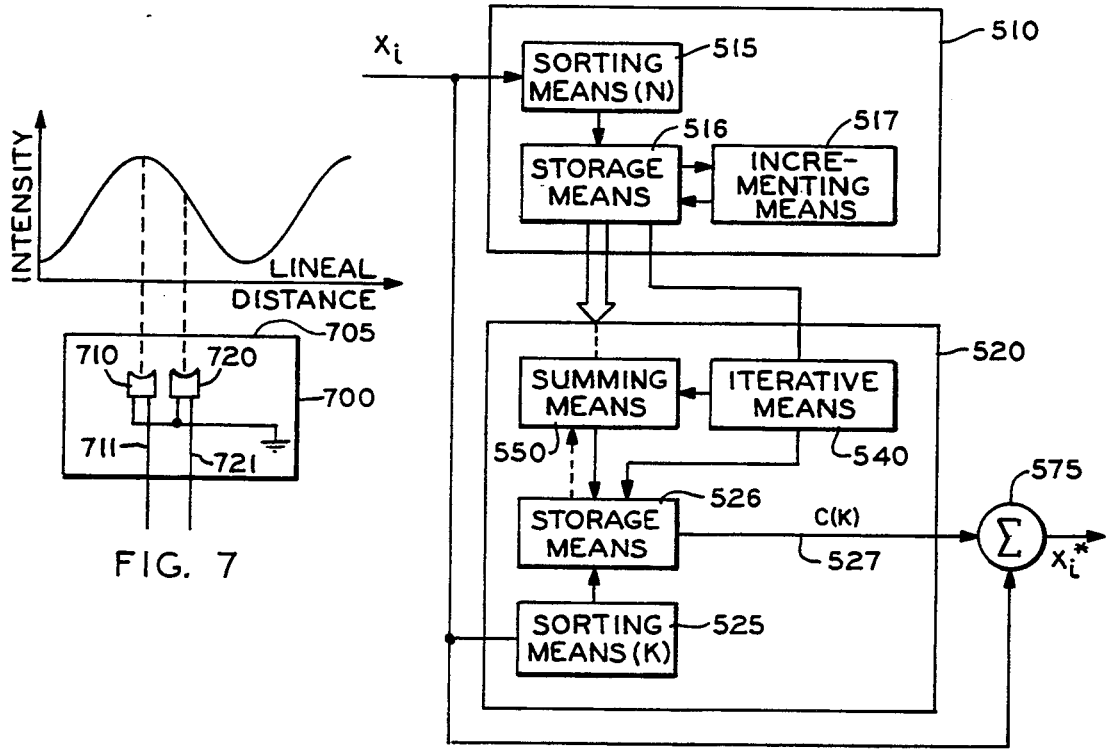
FIG. 7
FIG. 5
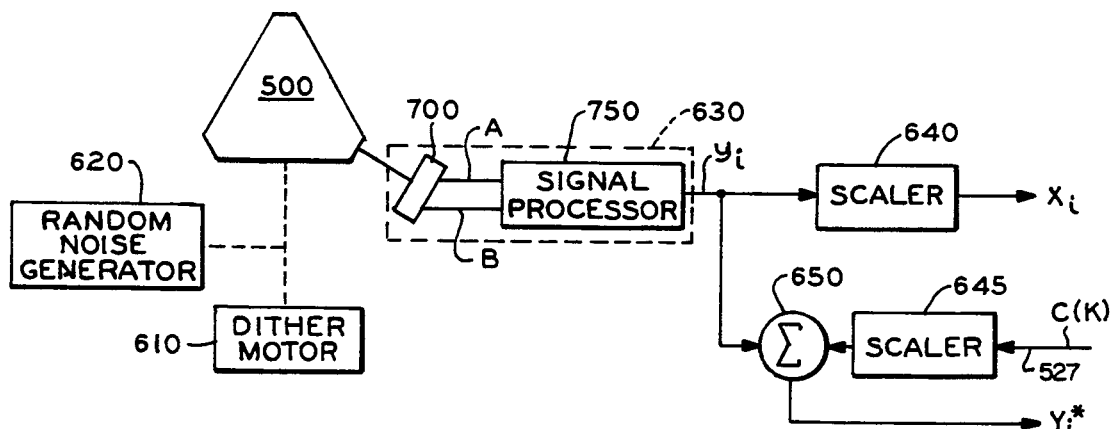
FIG. 6

METHOD AND APPARATUS FOR DISTORTION FREE MEASUREMENTS

The present invention relates to a method and apparatus for data correction of an observable parameter in order to remove systematic distortion from the measurement. Specifically, the present invention is a method and apparatus which provides correction for systematic distortion of a measurement of the phase angle between two of the counterpropagating beams of a ring laser angular rate sensor.

Reference is hereby made to U.S. Pat. No. 3,373,650 entitled "Laser Angular Rate Sensor" and U.S. Pat. No. 3,467,472 entitled "Random Bias For A Ring Laser Angular Rate Sensor" both by J. E. Killpatrick which are both assigned to the same assignee as the present application.

The art of ring laser angular rate sensors has been well developed. The sensor consists of two electromagnetic waves in the form of monochromatic beams of light which are generated to propagate in opposite directions substantially along an optical closed-loop path which defines the input axis about which rotation rate is to be sensed. The optical closed-loop path is usually made up of at least a plurality of straight line segments along which the beams of light propagate in opposite directions about a resonant structure. The closed-loop path is substantially defined by a plurality of wave reflecting surfaces such as mirrors. Along the closed-loop path coupling of energy occurs between each of the waves due to such contributors among others, as backscattering of the wave reflecting surfaces and losses through the medium. Coupling of energy between the waves results in the phenomena known as "lock-in." Lock-in is a situation where the frequency of each of the waves locks in to a common frequency. "Lock-in or rotation rate" is the rate of rotation of the sensor below in which there is no discernible frequency difference to obtain a measurement of rotation.

The sensors of the class described may be provided with a frequency biasing means so that measurement of rotation rates below the lock-in rate may be obtained. Frequency biasing may be provided by a variety of techniques such as those taught in the aforementioned patent where the frequency difference periodically alternates in sign. Frequency bias may also be provided by sufficient frequency separation of the frequencies of the counterpropagating waves. The frequency bias may be introduced by rotationally oscillating the sensor back and forth or by rotating the sensor at a sufficiently high constant rate. Further, the frequency bias may be introduced by frequency separating means in the optical path of the waves as a Faraday Cell. The frequency separation or bias provided by such a cell may be oscillated or may just provide a constant frequency separation. These and other techniques are well known in the art.

Sensors with a varying frequency bias are commonly referred to as dithered gyros. Unfortunately, associated with dither gyros is an error term referred to as random drift. Random drift is a buildup of rotation output error due to lock-in which is brought about as a varying frequency difference goes through zero. A resulting minimum random drift may be obtained by driving or controlling the ring laser angular rate sensor to perform or operate at a minimum lock-in condition having a minimum lock-in rate. Furthermore, a minimum lock-in rate optimizes the sensor scale factor which is particularly significant in sensors with constant rate bias.

As is well known in the art of ring laser angular rate sensors, lock-in error in a dithered gyro is a function of the phase angle between the counterpropagating beams. This may be derived from what is known as the lock-in equation taught in a publication entitled, "Laser Applications," Volume 1, 1971, by Aronowitz. Incremental lock-in error, which contributes to random drift, occurs substantially about the point of rotation direction reversal, i.e. the rate of change of the phase difference between the counterpropagating beams is zero. Hereafter this situation will be called the zero rate crossing (ZRC). This is not to be confused with the change in polarity of the dithering bias. Each ZRC is defined at the first derivative of the phase difference being zero at either of a first or second polarity of the second derivative thereof. Lock-in error is a function of the behavior of the phase angle at the ZRC instant. The resultant lock-in error in the rotation output accumulates in the output at each zero rate crossing (ZRC). Therefore, if a precise measurement of the phase angle can be determined, the lock-in error can be accumulated for correction and/or can be used in a closed-loop control system for altering the dither motion so as to force particular values of the ZRC phase angle which affects the incremental lock-in error so as to cancel previously accumulated lock-in errors.

A precise measurement of the phase angle between the counterpropagating waves is necessary to either precisely (i) accumulate lock-in error and provide correction, or (ii) reduce the lock-in error by closed-loop control. Unfortunately, precise measurement of the phase angle is difficult since there usually exists a systematic distortion in any measuring apparatus. This distortion can lead to bias errors in the ring laser angular rate sensor leading to degrading sensor performance.

SUMMARY OF THE INVENTION

The present invention provides a method and apparatus for removing systematic distortion from measurements of an observable parameter. Furthermore, the method and apparatus of the present invention is particularly useful for removing systematic distortion in phase angle measurements of ring laser angular rate sensors. In the present invention, an empirical probability density function is generally based on a plurality of selected measurements of an observable parameter. A characteristic distribution function of true values of the observable parameter is assumed. Finally, any measurement value can then be corrected or substituted for by determining the empirical probability value corresponding to the occurrence of the measurement value based on the empirical probability density function so as to determine the true measurement value corresponding to the empirical probability value based on the known characteristic distribution function.

In another aspect of the present invention, the empirical probability density function is continuously updated.

In another aspect of the present invention, a ring laser angular rate sensor is forced to produce a suitably random value of a phase angle between counterpropagating waves occurring at a selected zero rate crossing of a dithered sensor. Such randomization forces the characteristic distribution function of the true values of the zero rate crossing phase angle to be that of a uniform probability variable.

DESCRIPTION OF THE DRAWINGS

FIG. 5 is a diagrammatic block diagram of the present invention.

FIG. 6 is a block diagram showing a ring laser angular rate sensor system providing phase angle information and means for correcting the values thereof.

FIG. 7 shows an output scheme for ring laser angular rate sensors.

FIG. 8 graphically illustrates a ZRC phase angle and a method for determining the angle.

DETAILED DESCRIPTION OF THE INVENTION

Figure 1:
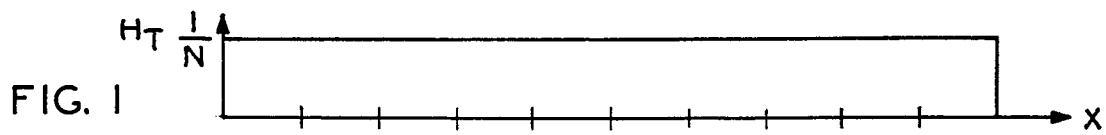
FIG. 1 graphically shows an equal probability density function.
Figure 2:
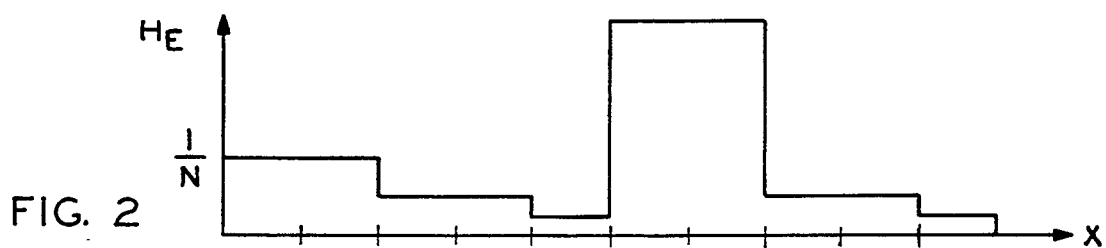
FIG. 2 graphically shows an empirical probability density function.

FIGS. 1-4 graphically illustrate the principles of the invention of the present application. The abscissa of each of these graphs is the same. FIG. 1 is a normalized "true" histogram, $H_T$, of an equal probability measurement of an observable parameter, "X," in which the probable measurement values $X_i$ are within a range between 0 and 1, and there is no distortion between the observed parameter and the measurement. The probability density value over the entire range is shown as a constant and therefore the summation of all probability density values of normalized $H_T$ is equal to one. Integration of $H_T$ defines the distribution function thereof and is graphically depicted in FIG. 4 and designated $P_T$ where the abscissa has values of X and the ordinate has values of cumulative probability. Since the range of values of X is between 0 and 1, with equal probability, the cumulative probability of an occurrence of a value of X not greater than $X_i$ is equal to the value of $X_i$.

For the analysis which immediately follows, the normalized histogram $H_T$ has measurement values between 0 and 1. Below, a more general application of the principle of the present invention to measurement values having a different range will be developed using a simple normalization process.

Assume there exists a systematic distortion in measurements of an observable parameter. Under ideal circumstances, if an observable parameter has equal probability of occurrence, measurement values thereof will also have an equal probability. On the other hand, if there exists a systematic distortion, measurement values of the observable parameter will not have an equal probability even though the observable parameter has an equal probability, Therefore, an empirical probability density function or histogram $H_E$ can be generated based on measurements of the observable parameter like the one shown in FIG. 2 to show the systematic distortion. The empirical probability density values of FIG. 2 have been selected for exposition purposes. The normalized distribution function of $H_E$ is also illustrated in FIG. 4 and identified by $P_E$.

Figure 3:
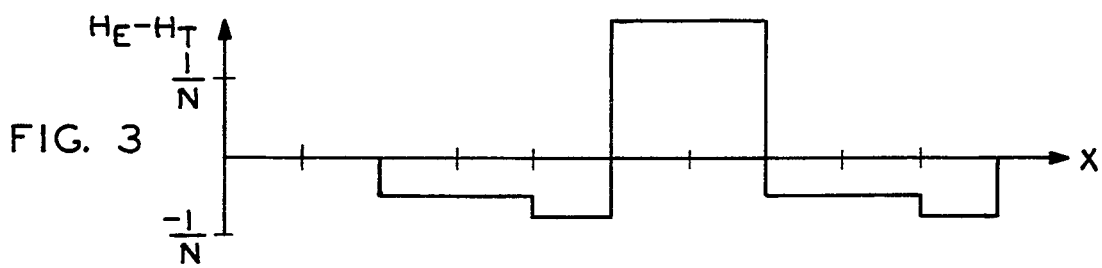
FIG. 3 graphically shows the difference between FIGS. 1 and 2.

The empirical probability function $H_E$ is different than $H_T$ if there exists a systematic distortion in the measurement process of the observable parameter X as aforesaid. The value of $H_E$ less $H_T$ is graphically illustrated in FIG. 3. Integration of FIG. 3 is illustrated in FIG. 4b and is designated $P_{ET}$.

In the present invention, by knowing the cumulative probability of a measurement value of an observable parameter determined from its empirical probability density function, a corresponding true value can be determined by knowing its true probability density function or distribution function. Referring to FIG. 4 assume that one measures an X value identified by $X_{E1}$ ("E" stands for empirical). The empirical probability distribution function of $H_E$ indicates that such a measurement value should have a cumulative probability of occurrence of $P_{E1}$ as determined from curve $P_E$. Since the empirical measurement values of the observed parameter must have an equal probability, the true value of $X_{E1}$ is the corresponding value of X having a cumulative probability value of $P_{E1}$ on the equal probability distribution function PT, namely $X_{T1}$. Thus, the true value of the empirical value $X_{E1}$ is really $X_{T1}$. Thus, to remove the systematic distortion from the measurement $XE_1$, a correction of $\Delta V$ must be subtracted therefrom to yield the true value $X_{T1}$ (or simply substitute $X_{T1}$ for $XE_1$).

Figure 4:
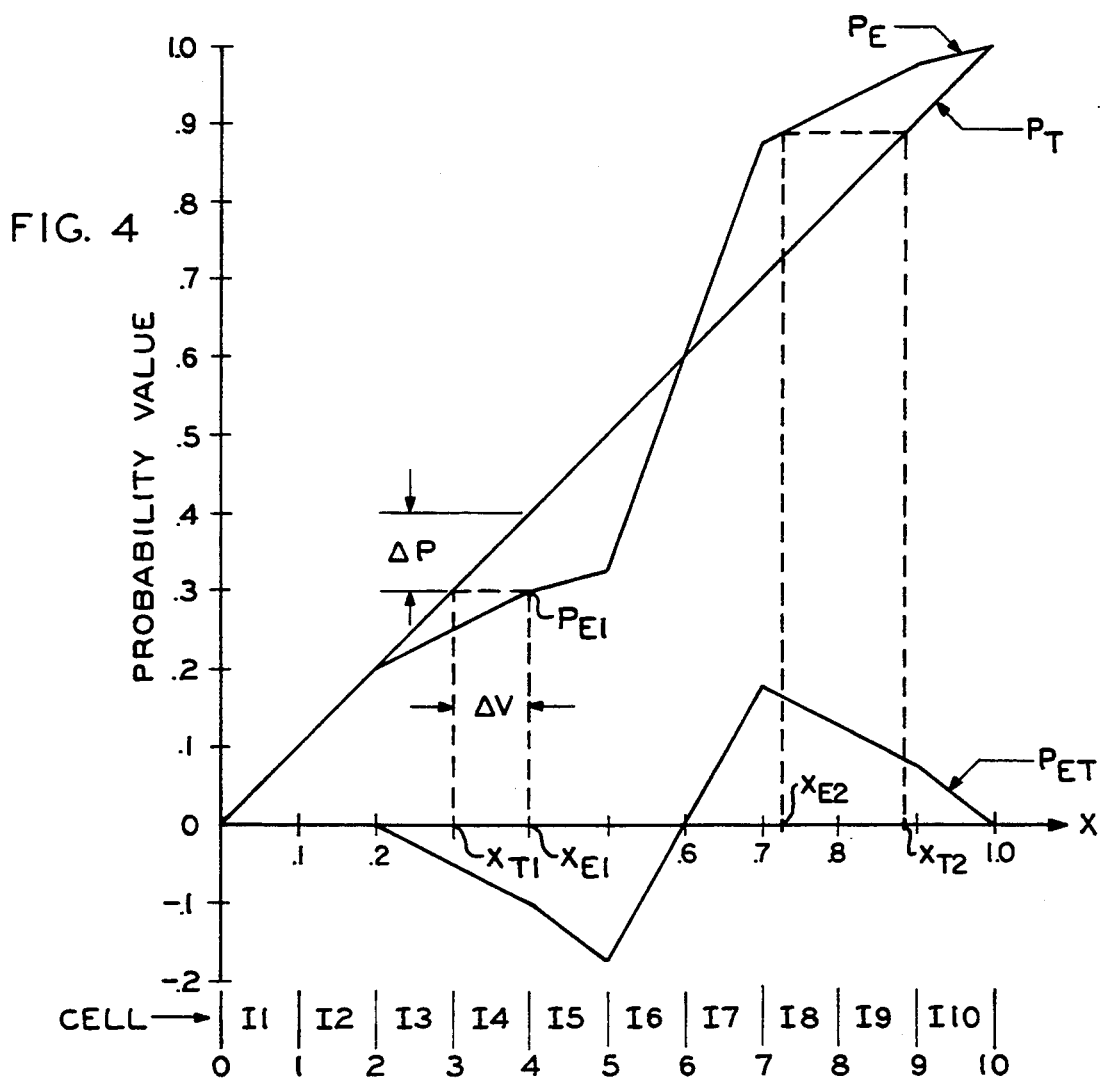
FIG. 4 graphically shows the distribution function of FIGS. 1, 2, and 3.

In FIG. 4, the difference in probability between $P_T$ and $P_E$ at the value $X_{E1}$ is equal to $\Delta_P$. Namely, the equal probability distribution function PT has a probability of 0.4 corresponding to a measurement value of $X_{E1}$ having a 0.4 value. It is paramount in the understanding of this invention to note that under the assumption of (i) an equal probability distribution function having (ii) a measurement range between 0 and 1, that:

$$\Delta P = \Delta V$$

This is so since the abscissa is equal to the ordinate value on the equal probability distribution function. Therefore, the correction value for any measured value of the observable parameter is the probability difference $(\Delta P)$ between the empirical probability value $(P_{E1})$ of the measurement value derived from the empirical probability density function and the true probability value $(P_{T1})$ of the measurement value derived from an equal probability density function. Furthermore, as illustrated in FIG. 4, the correction value for any measurement of the observable parameter may be obtained by simply knowing the probability difference function $P_{ET}$. $P_{ET}$ may be obtained by simply (i) subtracting a constant probability density value of a normalized equal probability density function from the empirical probability density function, and (ii) summing (integrating) the probability difference density values over the range X.

As a second example,

Let $X_{E2} = .725$

Then $P_{E2} = .875$, and $P_{T2} = .725$

Therefor $\Delta V = \Delta P = +.15$, and $$X_{T2} = X_{E2} + \Delta V$$
$$= .725 + .15 = .875$$

Shown in FIG. 5 is one embodiment of the invention practicing the principles of the invention as so far described. There shown is a first function generating means 510 for generating an empirical probability density function based on measurement values of occurrences of an observable parameter "$X_i$" which have an equal probability. The first function generator 510 is capable of establishing an empirical probability density function and a density value associated with each measurement value of the observable parameter. Further, a second function generator 520 is provided for generating a correction function, namely $P_{ET}$, thereby providing a correction value for every measurement value of the observable parameter. As indicated above, the correction value is substantially the integrated probability difference between the empirical probability value of the measurement value derived from the empirical probability density function and the true probability value of the measurement value derived from equal probability density function. The intended functions of first and second function generating means 510 and 520 may be provided by a single signal processing unit such as a microprocessor, a computer, or the like, and therefore details of such are well known and not presented herein.

The first function generating means 510 in one embodiment of the invention provides what is known as a group probability density function having N successive groups or cells where each group defines a range of successive measurement values. First function generating means 510 includes a sorting means 515, storage means 516, and incrementing means 517, each of which is systematically controlled through ordinary program/data control logic (not shown). The first function generating means, then, by observing a plurality of measurement values, provides a probability density value associated with each group. For example, assume that the values of the observable parameter lie between 0 and 1, and ten groups or cells are selected. This is illustrated on the abscissa of the graphs illustrated in FIGS. 1–4 and designated by I1–I0. To generate the empirical probability density function it remains to sort each measurement value to determine which cell the measurement value of the observable parameter falls within. Thus, first function generator means 510 includes a sorting means 515 for determining a specific group of the N successive groups that the measurement value falls within. The cell may be mathematically identified by:

$$I = \text{INTEGER}(N * X_{E2} + \tfrac{1}{2}) \tag{1}$$

Next, the probability density value corresponding to $i^{th}$ cell must be incremented by incrementing means 517. Storage means 516 contains an indexed array of memory locations for storing values $H_E(I)$. Appropriate cells $H_E(I)$ are incremented by incrementing means 517 which may be mathematically expressed as:

$$H_E(I) = H_E(I) + INCR \tag{2}$$

where the incremental value "INCR" will be discussed in more detail later.

As indicated above, the second function generator provides a correction function or table thereby providing correction values. Assume that the empirical probability density function has been generated and normalized such that the sum of all H (I)'s is equal to one. A correction value corresponding to each cell may be mathematically expressed as:

$$C(I) = \sum_{i=1}^{I} H_E(i) - \frac{I}{N} \tag{3}$$

Thus a table of values is generated with each table location corresponding to a selected range of values $X_i$ as will be further explained. To correct a measurement value of the observable parameter, an appropriate value of C(I) must be selected from the table. This may be accomplished by a first sorting process which includes rounding off the measurement value to the nearest 0.5 for selecting the appropriate correction value table location from the correction value table. This is mathematically described as:

$$K = \text{INTEGER}(N * X_{Ei} + \tfrac{1}{2}) \tag{4}$$

Therefore, the corrected value of the measurement, $XE_i$ is:

$$X^*_{Ei}(\text{"corrected"}) = X_{Ei} + C(K) \tag{5}$$

As illustrated in FIG. 5, the measurement value $X_{Ei}$ is presented to sorting means 515 for determining which cell "I" of "N" cells that the measurement value falls within. The output of sorting means 515 is presented to storage means 516 for designating which storage cell of the empirical probability density function, $H_E$ is incremented by incrementing means 517. The process performed by first function generating means 510 is substantially independent of the second function generating means thereby allowing a continuous updating of the empirical probability density function.

The second function generating means 520 also includes a sorting means 525 for determining the correction cell "K." The appropriate correction cell is that cell which corresponds to a measurement value closest to the present measurement value. The output of sorting means 525 is presented to storage means 526 which allows the value stored in storage means 526 corresponding to cell K on output signal line 527 which is presented to summing means 575. Summing means 575 sums the measurement value $X_{Ei}$ with the correction value on line 527, C(K), for providing the corrected measurement value $X_{Ei}$.

Further, second function generating means 520 also includes an iterative index means 540 and summing means 575. The output of iterative index means is also presented to storage means 516. In operation, the iterative index means 540, summing means 575, and storage means 516 provides the mathematical function as shown and described by equation (3).

In a real time system, the first function generating means should provide a continuously updated empirical probability density function. This is so since the systematic distortion may be dependent upon the environment in which the observed parameter is subjected. Further, the correction table should also be continuously updated, but at the same time should be continuously available for data requests. This may be accomplished by combining equations (2) and (3) to some extent for providing the appropriate correction value in the correction cell. This is accomplished by (i) incrementing each $H_E(I)$ cell upon a measurement value of that cell by a value of 1/N where N is the number of cells selected; and (ii) iteratively summing each of the HE(I) cells preceding and including the $I^{th}$ cell and storing its sum in the corresponding correction cell C(I); and (iii)

deleting the probability density value of the $I^{th}$ cell of $H_E$ and replacing it with an initial value of "$-1/N$." This may be mathematically expressed by the logic steps:

```
Repeat
For I=1 to N
SUM=SUM+H(N)
C(I)=SUM
H(I)=-1/N
Next I
SUM=0
```

Thus, a correction value for the correction table is continuously updated in second function generating means 520; and the empirical probability density function is continuously updated.

Lastly, it may be desirable in some situations to update the correction values by a "filterative" process as indicated in equation (6).

$$C(I) = (1-\epsilon) \cdot C(I) + \epsilon \cdot SUM \quad (6)$$

where the filter constant $\epsilon$ is some number less than one. In this way, the correction table is updated but at a rate which should eliminate any perturbing influences which are part of the measurement process and not truly systematic distortion. In this circumstance summing means 520 is shown with a "dotted" arrow connection to the interaction required by equation (6). In the above discussion, it was assumed that X values are between 0 and 1. However, in practicing the invention, any range of possible measurement values having a "differential" defined by the difference between the maximum and minimum measurement values may be scaled between 0 and 1. By defining:

$$X_{Ei} = \frac{Y_i - Y_{min}}{D} \quad (7)$$

where $D = Y_{MAX} - Y_{MIN}$

Therefore, to obtain the corrected value $Y^*_i$ of the measured value $Y_i$, the correction value $C(K)$ must be multiplied by the differential D:

$$Y^*_i = Y_i + C(K) * D \quad (8)$$

where $C(K)$ is determined from the scaled value $X_{Ei}$ in accordance with equation (4).

The block diagram of FIG. 6 illustrates the principles of the invention of the present application particularly useful in a ring laser angular rate sensor. A ring laser angular rate sensor 600 is provided with a dithering bias provided for example by a dither motor 610. Dither motor 610 rotationally oscillates the sensor 500 back and forth in a rotational mode. Coupled to the output of dither motor 610 is random noise generator 620 having a function as will be subsequently described in more detail later. Coupled to sensor 600 is ZRC phase angle signal means 630 which provides an output signal $Y_i$ indicative of the ZRC phase angle. Signal means 630 comprises a signal means 700 and signal processor 750 as is substantially shown in FIG. 7.

A ring laser angular rate sensor system, 600 generally consists of a lasing medium providing two substantially monochromatic beams or waves of electromagnetic energy in the form of beams of light, a plurality of reflectors or mirrors defining an optical closed-loop path defining an enclosed area, the two beams of light being directed to travel along the optical closed-loop path in opposite directions. One output scheme for monitoring the behavior of the countertraveling beams in order to determine the frequency difference therebetween, which is indicative of the rotation of the closed-loop path, consists of having one of the plurality of the reflectors being slightly transparent so as to extract a portion of each of the counterpropagating waves. The extracted waves are combined by an optical system so as to heterodyne a portion of each of the waves to form an interference pattern which is projected on a signal means 100 as is substantially shown in FIG. 7 and will be briefly described here.

Referring to FIG. 7, a graphical representation of an interference pattern (intensity versus lineal distance across the pattern) produced by the output scheme just indicated is shown. Also shown in FIG. 7 is a signal means 700 commonly used in the art, responsive to the interference pattern which is projected on a surface 705 of signal means 700 and comprises at least one photodetector 710 having an output signal 111 indicated by the letter "A." In order to ascertain a direction of movement of the interference pattern, signal means 700 may also employ a second photodetector 720 having an output signal 721 which is indicated by the letter "B."

As is well known, the intensity of light on surface observed by either photodetector 705 is indicative of the instantaneous phase difference between the countertraveling laser beams or waves of the ring laser. When the sensor is not rotating the intensity at any point on the surface 705 remains constant. In the presence of rotation above the lock-in rate the intensity at a fixed point changes with time between maximums and minimums at a rate proportional to the rotation rate sensed by the sensor. In this manner, optical information is presented on surface 705 of signal means 700 for transduction to different signals such as electrical signals by photodetectors 710 and 720. These signals are usually amplified and processed to determine inertial rate and angular displacement of the sensor.

Consider now the sensor output interference pattern resulting from a periodically alternating sinusoidal bias, as described earlier, provided by rotational oscillation of the sensor by dither motor 610. FIG. 7 illustrates the output of an intensity of a photodetector in response to a dithering biasing scheme such as rotational oscillation. The wave form as shown rises and falls in a sinusoidal manner up until the instant of the ZRC turnaround indicated by time $T_O$. Each full cycle represents a change of two $\pi$ radian phase change between the counterpropagating waves. In order to determine incremental lock-in error, as aforesaid, the phase angle at $T_O$ must be determined relevant to time $T_x$. This may be accomplished by a variety of techniques. One such technique consists of measuring the cycle times such as $T_2$ and $T_3$ between time points $T_b$ and $T_x$, and $T_y$ and $T_a$ respectively. Furthermore, it is important to measure the time between points $T_x$ and $T_y$, indicated by time $T_1$. If the motion is assumed to be sinusoidal, the rate of change of the phase difference may be assumed to be parabolic. Having the intersignal times $T_1$, $T_2$, and $T_3$, the phase angle at $T_O$ may be determined.

Further shown in FIG. 6 is a signal processor 750 responsive to signal means 700 signals A and B for providing a measurement of the phase angle value $Y_i$ for each occurrence that the first derivative of the phase angle is zero, namely each ZRC. Inherent in each measurement $Y_i$ is a possible systematic distortion resulting from sensor 600, signal means 700, and signal processor 750. In order to obtain precise measurements of the phase angle at the ZRC instant, it is necessary to remove the systematic distortion from the measurement.

As indicated earlier, a random noise generator 620 is coupled to sensor 600 for providing random noise to the bias provided by dither motor 610. Accordingly, all values of the true ZRC phase angle will have equal probability of occurrence similar to FIG. 1. On the other hand, measurement values of $Y_i$ may not have equal probability due to systematic distortion in the measurement process. The systematic distortion in the ZRC phase angle measurement $Y_i$ may be removed by application of the present invention as particularly described with further reference to FIGS. 5 and 6. The signal processor 750 output signal $Y_i$ is passed through a scaler identified by block 640 which converts signal $Y_i$ into the form of $X_i$ into the form of $X_i$ as expressed in equation (7). The output C(K) on signal line 527 from the second function generating means 520 is passed through a second scaler identified by block 645 which multiplies C(K) by D. Summing means 650 provides a corrected measurement value $Y^*_i$ as particularly described by equation (8). In these circumstances summing means 575 and the connections thereto are unnecessary.

As pointed out earlier, the usefulness of the phase angle measurement represented by $Y_i$ may be employed in a closed-loop control system for controlling the dither motor 610. In such circumstances, the random noise generator 620 of FIG. 6 must be selectively switched to allow controlled values of the ZRC phase angle and corresponding values of $Y_i$ which will no longer be random. Therefore, updating of the empirical probability density function by the first function generating means 510 can only be based on those values of $Y_i$ when the $Y_i$ is based on truly random ZRC phase angle values. Accordingly, a synchronization system, not shown, must be employed to only provide first function generating means 510 with values $Y_i$ which are responsive to the random noise generator 620, and have the ability to disable the random noise generator in those situations when the corrected measurement values $Y^*_i$ are used for controlling the dither motor 610. Synchronization may be accomplished by any of a variety of gating techniques or computer logic (hardware or software).

As particularly illustrated, the embodiments of the invention have utilized an equal probability density function. In some situations an equal probability density function is not possible. Nevertheless, the present invention is applicable to such a situation by utilizing a slight modification. Namely, one need only to know what the true probability function is and provide a second correction table which includes a secondary set of correction values which are equal to the difference between the true probability density function and an equal probability density function. Thus, equation (5) becomes:

$$X^*_i = X_i + C(K) + C'(K)$$

C'(K) is the correction value of the measurement and is the difference between the actual measurements for the same probability corresponding to the equal probability density function and the true probability density function.

There are, of course, many modifications which may be made to the invention as presented in FIGS. 1-6. Although the invention of the present application has been shown particularly with a ring laser angular rate sensor, the invention of the present application may be applied to any measurement value of an observable parameter. However, as was pointed out earlier, if the observable parameter is not inherently random, some means must be employed for forcing measurement values to be or have an equal probability of occurrence in generation of the empirical probability density function described above. In the ring laser rate sensor case, random noise was provided by selective use of random noise generator 610 having a wide variety of configurations including, among others, a pseudo random noise generator.

The embodiments of the invention in which an exclusive property or right is claimed are defined as follows:

1. In a ring laser angular rate sensor of the class wherein two waves propagate in opposite directions along a closed-loop path, wherein the frequency of each of said waves is a function of the rate of rotation of said closed-loop path, said waves establishing a phase difference therebetween, wherein the sensor provides an output signal indicative of the rotation of said closed-loop path, wherein said sensor is provided with a biasing means for introducing a frequency bias in at least one of said waves for preventing said waves from locking in to a common frequency for at least a majority of the time, the sensor comprising:

signal means responsive to said waves capable of providing a measurement value related to said phase difference between said waves, said signal means providing said measurement value for occurrences of selected values of the first derivative of said phase difference;

means coupled to said sensor for selectively causing said phase difference to take on a substantially random value at selected occurrences of said selected values of the first derivative thereby defining random phase measurement values;

first function generating means for generating an empirical probability density function based on said random phase measurement values, said empirical probability density function establishing an empirical probability density value and empirical probability value associated with each measurement value;

second function generator means for generating a correction function capable of providing a correction value for said measurement value, said correction value being related to a probability difference between said empirical probability value of said measurement value derived from said empirical probability density function and the true probability value of said measurement value derived from an equal probability density function; and output means for providing a corrected measurement value, said corrected measurement value being the sum of said measurement value and said correction value corresponding to said measurement value.

2. The sensor of claim 1 wherein said second function generating means includes summing means for obtaining a summation of each probability density value of said empirical probability density function associated with every measurement value between a first limit value and said measurement value inclusive, said empirical probability value being related to said summation.

3. The sensor of claim 1 wherein said first function generating means is capable of generating a group probability density function of N successive groups wherein each group defines a range of successive measurement values, each one of said N groups having a probability density value associated therewith, said first function generating means further including, sorting means for determining a specific group of said N successive groups that said measurement value falls within; and means for incrementing said empirical probability density value of said specific group.

4. The sensor of claim 3 wherein said second function generating means generates a correction function having a table consisting of a correction value for each one of said N groups at an $n^{th}$ table location corresponding to said groups, said second function generator means including, means for providing a sum of said probability density values of said empirical probability density function associated with all succeeding ones and including the $n^{th}$ one of said N groups;

means for storing said sum in said $n^{th}$ table location; and means for replacing said empirical probability density value of said empirical probability density function corresponding to said $n^{th}$ group of said N groups with a predetermined initial value.

5. The sensor of claim 4 including means for iteratively updating said correction table independent of said probability density value incrementing.

6. The sensor of claim 1 wherein said selected values of the first derivative includes at least those having a zero value and having a second derivative of a first polarity.

* * * * *